United States Patent [19]

Trankner et al.

[11] 3,760,700
[45] Sept. 25, 1973

[54] SINGLE-LENS REFLEX CAMERA

[76] Inventors: Werner Trankner, 3, Grunwinkel;
Erich Hahn, Heidemuhlweg 45;
Werner Hahn, 71 Dobritzer Strasse;
Helmut Tillig, 8 Nagelstrasse, all of
Dresden, Germany

[22] Filed: Dec. 14, 1971

[21] Appl. No.: 207,819

[52] U.S. Cl. .............. 95/10 B, 88/1.5 R, 95/11 V, 95/42
[51] Int. Cl. ............................................. G01j 1/00
[58] Field of Search ............. 95/10 B, 10 PO, 11 V, 95/42 R; 88/1.5 R

[56] References Cited
UNITED STATES PATENTS

| 3,630,134 | 12/1971 | Nakamura | 95/42 |
| 3,524,380 | 8/1970 | Yamada et al. | 88/1.5 R |
| 3,034,411 | 5/1962 | Sauer | 88/1.5 R |

FOREIGN PATENTS OR APPLICATIONS

| 757,898 | 10/1933 | France | 95/10 B |
| 275,465 | 8/1951 | Switzerland | 95/10 B |

*Primary Examiner*—Fred L. Braun
*Attorney*—William A. Drucker

[57] ABSTRACT

A single lens reflex camera having within its housing a viewfinder which includes an image erecting system, an image field lens and an eyepiece. The camera is provided with a grey wedge having various values of grey situated in the housing adjacent an image erecting surface of the erecting system. A light guiding member positioned on the image erecting surface directs light from the subject through the grey wedge into the eyepiece. Exposure factor setting elements are coupled with an indicating device which is movable along the grey wedge by adjustment of the setting means. The illuminated wedge and indicator is visible in the viewfinder to enable setting for accurate exposure.

7 Claims, 4 Drawing Figures

SINGLE-LENS REFLEX CAMERA

BACKGROUND OF THE INVENTION

The invention relates to a single-lens reflex camera with an image-erecting optical system with a built-in optical exposure meter constructed as a grey wedge.

Photographic cameras are known in which the luminous density of the subject is measured by means of a grey wedge photometer situated in the interior of the camera, e.g., in the "taking chamber." The grey wedge values are reflected into the path of the rays of a viewfinder device, such as a Newton viewfinder, by means of prisms. Photometers in conjunction with a prism telescope with an image-erecting device are also known, and such apparatus is set to "field equality" of two surfaces resting close together or to the complete disappearances of the boundaries. These photometers operating with light-attenuation means, e.g. grey wedges, in conjunction with photo-electric means, are not the subject of the invention.

Reflex cameras are also known which have a built-in exposure optical meter situated in the path of the viewfinder rays and which operate on the principle of a grey wedge photometer. In such cases the photometer is situated either above or below the image-focussing plate and is pivoted into or out of the path of the viewfinder rays as required. Apart from the input of mechanical apparatus involved in a pivoting mechanism the known system suffers from the drawback that the grey wedge, when pivoted to the image-focussing plate is, not evenly illuminated, resulting in serious measuring errors in the operation of assessing the correct luminous density for the subject.

Finally, an exposure measuring device for photographic cameras is known which in addition to a photo-electric exposure measuring device at the same time uses an optical exposure measuring device operating on the photometer principle with light-attentuating means. Both devices are built into the camera housing of a reflex camera. The photometer principle used in this case is not suitable as a means of performing a reliable test for "field equality" of the two comparison surfaces reflected into the path of the viewfinder rays.

Reflex cameras are also known with a built-in photometric exposure meter operatively connected with a device bearing the exposure values. In this case use is made of a pair of grey wedges graduated in image density and connected via gear wheels, racks, threaded spindles or levers with a time adjusting device for the shutter, with the lens diaphragm and with a scale indicating the speed of the film. The gearing equipment involved occupies a great deal of space, entails considerable labour for its assembly and is not free of technical failures and breakdowns.

The purpose of the invention is to enable the means for the photometric exposure measuring operation and also the connection between the optical exposure measuring device situated in the viewfinder system and the exposure time adjusting device situated on the camera to be considerably simplified.

The aim on which the invention is based is to provide an exposure measuring device operating by the grey wedge photometer principle, with a single-lens reflex camera, in which the viewfinder image, in contradistinction to the equipment already known, is in no way disturbed, while a uniform illumination of the grey wedge is obtained and, finally, is measured integrally in the case of a grey wedge illuminated from outside and semi-integrally or partially if the grey wedge is illuminated by the path of the lens ray by diverting some of the viewfinder light. When only one graduated grey wedge is employed, a gearing is thus provided which operates free of interference and at the cost of only moderate input of technical apparatus.

SUMMARY OF THE INVENTION

According to the invention there is provided a single lens reflex camera having a housing enclosing a viewfinder which includes an image erecting system having an image erecting surface, an image field lens and an eyepiece, including:

a. a grey wedge having various values of grey, situated in the camera housing adjacent the image erecting surface, b. light guiding means positioned on the image erecting surface for directing light from the subject through the grey wedge and into the eyepiece;

c. exposure factor setting means positioned on the camera housing;

d. indicating means movable along the grey wedge and e. coupling means connected between the indicating means and the exposure factor setting means adapted to effect movement of the indicating means in response to exposure factor setting, whereby the illuminated wedge and indicating means is visible in the viewfinder to enable setting for accurate exposure.

The advantages offered by the invention reside in the fact that in contradistinction to previously known constructions the input of optical and mechanical components involved is very moderate and, above all, that from an optical point of view the grey wedge values are always seen in sharp focus, owing to the fixed position of the grey wedge in relation to the viewing system.

The camera may be provided with a measurement aperature in the camera body through which light from the subject passes to the light guiding means for illuminating the grey wedge. Alternatively the camera may be provided in the viewfinder with means for diverting light from the image erecting system to the light guiding means for illuminating the grey wedge.

Further characteristics of the invention will emerge from the drawing and description.

The invention is illustrated and described in a number of examples. The diagrams only show the components essential to the illustration and forming part of the invention.

BRIEF DESCRIPTION OF DRAWINGS

The accompanying drawings provide the following schematic diagrams.

DESCRIPTION OF PREFERRED EMBODIMENT

Figure 1:
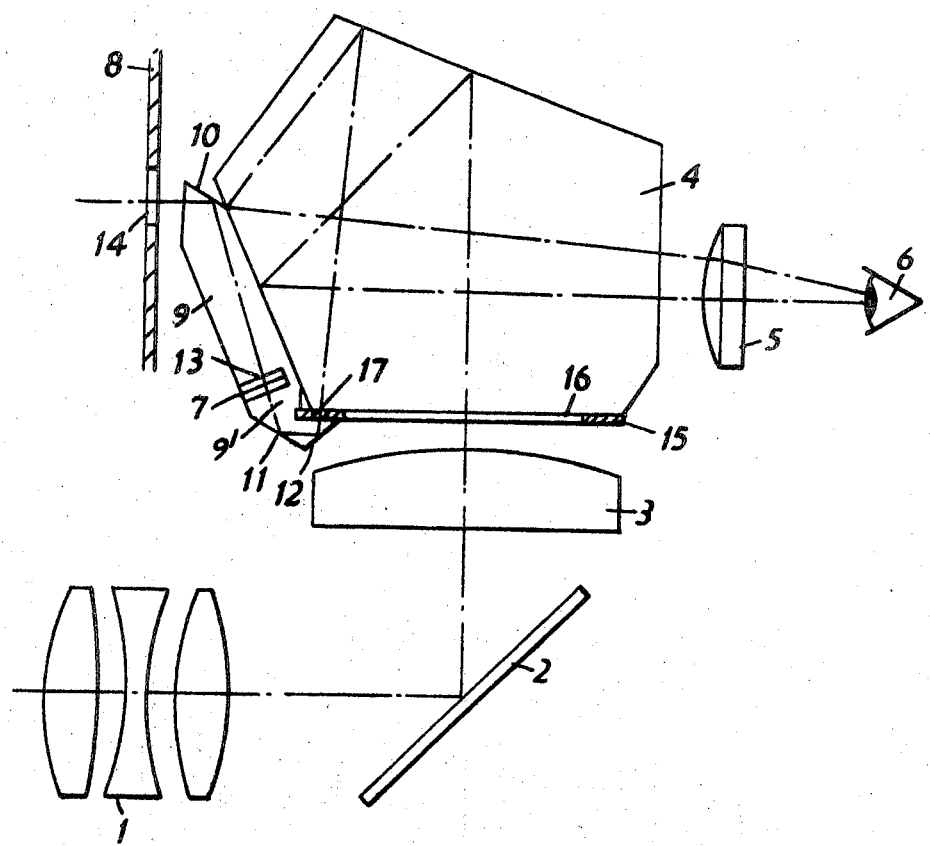
FIG. 1 is a latteral view of a reflex camera, with an image-erecting optical system and a photometric exposure measuring device, the light being guided from the outside, for the illumination of the grey wedge photometer.

As shown in FIG. 1, the light coming from the subject passes through a lens 1 via a reflex mirror 2, and through a image-field lens 3 into a image-erecting optical system (in the present case a pentaprism 4, in order to pass from there, after multiple reflection through an eyepiece 5, to the eye 6 of the observer. A graduated grey wedge 7 already known in itself and situated approximately in the plane conjugated with the image field lens or collimator lens 3, is preferably positioned in the space between a camera covering cap 8, only partly shown in the drawing, and near the image field lens 3 of the viewfinder system. The grey wedge 7, provided with figures in the known manner, e.g., 1 – 8, is supported or affixed in a light-guiding bar 9 made in one part or in several parts and consisting of a number of reflection surfaces 10, 11 and 12.

Figure 2:
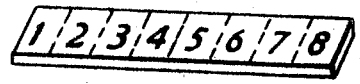
FIG. 2: an example of a grey wedge.

The graduated grey wedge 7, which is constructed, for example, as a narrow strip, is made up, as is known, of small stages equal in area and of different permeability to light, and these are marked, for example, with certain figures, as shown in FIG. 2. The graduated grey wedge is made up of a transparent basic body and a neutral grey coating, applied photochemically, for instance, with a number of sectors of equal size, the permeability to light varying from one sector to another. These are the components entering into the construction of a graduated grey wedge, which does not form the object of the invention.

Above the grey wedge, in the slit light-guiding bar 9, is a light exit surface 13 with a matt finish. The grey wedge 7 is evenly illuminated through an orifice 14 provided in the front wall of the camera covering cap 8. As a means of limiting the field a mask 15 is provided, in the known manner, between the image field lens 3 and the pentaprism 4, and possesses not only the mask recess 16, which enables the light rays coming from the lens 1 to enter the pentaprism 4 in an image-limiting manner, but also a longitudinal orifice 17 through which the light rays arriving through the orifice 14 are likewise enabled to enter the pentaprism 4. After multiple reflection inside the pentaprism 4, the said light rays reach the eye 6 of the observer together with the rays coming from the reflex mirror 2.

The photometric integral exposure measuring device shown in FIG. 1 operates as follows:

The light rays coming from the subject and, of course, entering the light guiding bar 9 via the orifice 14 and the camera covering cap 8 in a greater or smaller quantity, according to the brightness prevailing, illuminate the grey wedge 7 uniformly, owing to the matt finish of the surface 13. The grey wedge is constructed, in the known manner, as a graduated grey wedge, as shown in FIG. 2, in such a way that the thickness of the figures marked thereon differs in its density. When the graduated grey wedge provided with figures is evenly illuminated the density of that particular stage is selected which the eye of the observer is still just able to perceive by comparison with black surroundings. This figure, as is known, is equivalent to a certain luminous density of the subject, with corresponding adaptation of the eye. The phototechnical parameters, such as diaphragm, shutter time and film speed, are determined from a calculating disc, on the basis of the grey wedge figure of which the reading has been taken.

Figure 3:
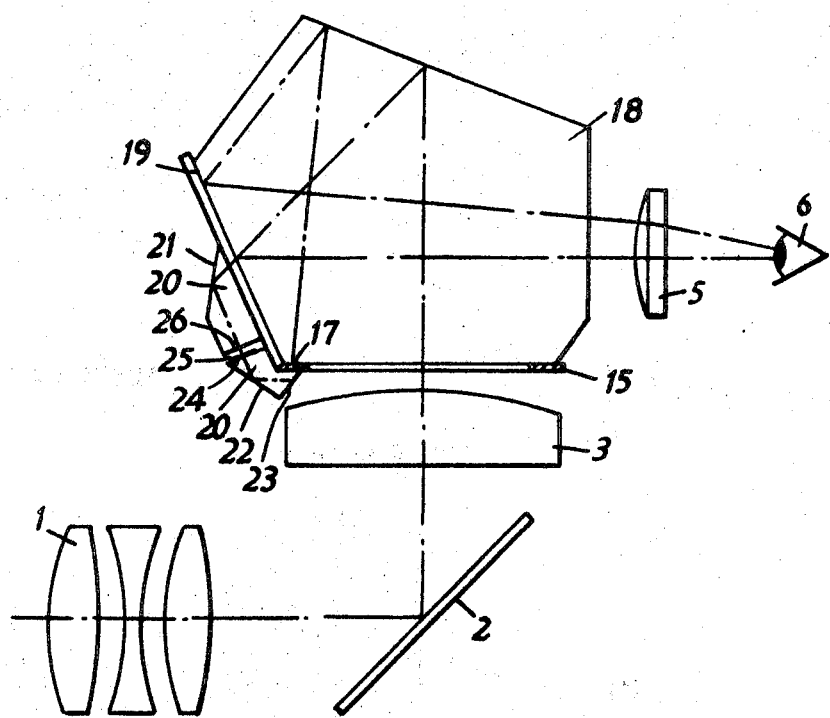
FIG. 3: a further example of the light-guiding system inside the camera housing, for the illumination of a grey wedge photometer.

In a further example of the invention, according to FIG. 3, the graduated grey wedge is illuminated by viewfinder light diverted inside the camera chamber. The light coming from the taking lens 1 is guided via the reflex mirror 2 through the image-field lens 3 into the image-erecting viewfinder system, e.g. a pentaprism 18 with a partially mirror-coated image-erecting surface 19. Parts of the viewfinder beam are guided, in the known manner, as a result of multiple reflection, to the eye 6 of the observer. Some of the viewfinder light passes through a non mirror-coated portion of surface 19 and from there into a light guiding bar 20 situated behind the said surface 19. The light guiding bar 20, made in one part or in a number of parts, has several reflection surfaces 21, 22 and 23. Between these reflection surfaces, within the dioptric range of the viewfinder eyepiece 5, a graduated grey wedge 24 is situated inside a slit 25 provided in the light guiding bar 20, underneath a surface 26 with a matt finish. The viewfinder rays from the pentaprism 18 illuminate the graduated grey wedge 24 and, after multiple reflection pass through the orifice provided in the image field mask 15, into the pentaprism 18, from which, as a result of multiple reflection, together with the rays coming from the reflex mirror 2, they are perceivered by the eye 6 of the observer.

In the same or in a similar manner to that described in the first example the observer takes a reading of that figure or symbol on one of the grey wedge fields which is still just visible to him, so that he can then determine, with the calculating disc, the phototechnical parameters, on the basis of the grey wedge figure of which the reading has been taken, or so that the graduated value found from the grey wedge can be fed into a computer mechanism.

Figure 4:
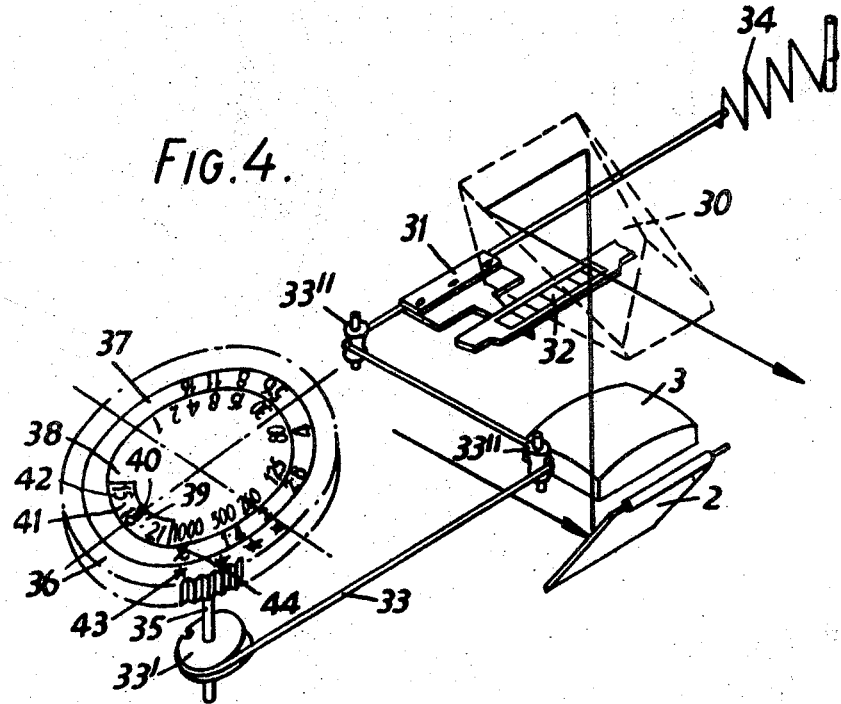
FIG. 4: a photometric exposure meter operatively connected with an apparatus bearing the exposure values.

FIG. 4 shows the operative connection between the exposure meter and a device bearing the exposure values.

Through a photographic lens not shown in the drawing light passes through the reflex mirror 2 and through the image field lens 3 into the image-erecting viewfinder prism system 30, from which, by multiple reflections, it reaches the eye of the observer. An indicator 31 is provided below or above a graduated grey wedge disc 32, situated in the space between a side of the camera housing which is not shown and the image field lens 3. The indicator 31 is rigidly connected to a cable 33 which passes over a number of pulleys 33" which change their direction. One end of the cable 33 is connected with a cable pulley 33' and the other end with a spring 34. The cable pulley 33' is operatively connected, via a shaft 35 or via a cam disc not shown in detail in the drawing, with a knurled setting ring 36 to be operated by hand. Coaxial with the setting ring 36 are two centrally situated discs or rings 37, 38, bearing the time values and diaphragm values. The setting ring 36 can be coupled with the diaphragm ring 37, in the known manner, by friction, and is rotatable in relation to the fixed ring 38 bearing the exposure times. The said ring 38 has a segmental recess 39 and an index marked 40. Underneath the ring 38 is a scale 42 which is provided on a plate 41 rigidly attached to the housing and which forms the film speed values, the time ring 38 being mounted so as to be rotatable or displaceable in relation to the scale 42 by the use of known friction means.

The operatively connected exposure value setting device functions as follows:

When the film is inserted the DIN or ASA number corresponding to the film speed must be set; this operation, as is known, alters the diaphragm-time combination without the setting ring 36 participating in the movement.

Before the exposure measuring operation the adaptation symbol 43 corresponding to the "taking conditions." i.e., moderate sunlight, bright sun, partly overcast sky or dark background, is to be positioned opposite to the diaphragm value on the ring 37, which is given as the initial aperture on the lens used, as soon as the graduated grey wedge is illuminated by the light diverted from the viewfinder, as shown in FIG. 3. If, on the other hand, the graduated grey wedge is illuminated by light from the outside, as shown in FIG. 1, then the appropriate adaptation symbol 43 is to be positioned opposite a mark 44 provided on the ring 37.

In the exposure-measuring operation the adjustment is effected on the principle of optical extinction, i.e., that grey field of the graduated grey wedge 32 which can still just be perceived by the eye is a measure of the exposure. By rotating the setting ring 36 the follow-up indicator 31 has been positioned, by means of the cable 33, opposite that grey field of the graduated grey wedge 32 which is still just perceptible. The diaphragm and exposure time combination corresponding to the preselected film speed 32 can then be read on the diaphragm ring 37 and the time ring 38.

The invention also provides that the exposure-measuring device can be coupled with the setting devices of the camera in the known manner. In this case either the diaphragm or the exposure time can be set, as desired.

If, for example, only the exposure time is to be coupled, then a time setting knob provided on the camera and not shown in the drawing and corresponding to the time ring 38 must be movable to a position opposite a fixed mark on the housing. The DIN or ASA setting ring 41/42 is then rotatable in relation thereto, and the setting ring 38 with the adaptation symbols 43 is in its turn rotatable in relation to the setting ring aforementioned. Starting from this setting ring 36 the follow-up indicator 31 is moved in the manner already described. The graduated grey wedge 32 is advantageously provided with the diaphragm numbers 1.4, 2.8, etc. The follow-up indicator 31, in the measuring operation, is positioned opposite the diaphragm value which is still just perceptible. The exposure time required for this diaphragm has thus been set.

When the diaphragm is coupled in addition the graduated grey wedge 32 bears no diaphragm values. It is coupled with the diaphragm setting ring of a lens not shown in detail in the drawing and possesses as many additional grey wedge stages as there are diaphragm values to be fed in.

The system can also be arranged, for example, as follows:

Perpendicularly to the length of the fixed graduated grey wedge a second graduated grey wedge is controlled by the diaphragm ring of the lens and has a height equal to the length of the fixed graduated grey wedge and possesses as many grey wedge stages as there are diaphragm values to be fed into the apparatus.

The invention does not relate solely to the examples given. It is perfectly conceivable for the image-erecting system of the single-lens reflex camera to consist either of an optical lens system with a number of intermediate reproduction planes or of different prism combinations with image reversing surfaces, which provide an upright image the right way round. Similarly, the light-guiding means, which serve to illuminate the graduated grey wedge and to convey the light rays into the viewfinder system, within the conditions required by the invention. The light-guiding means, as already mentioned in the description may be made in one part or in several parts, e. g., of transparent synthetic resin. Similarly, the light-guiding means may be provided at a certain distance from the image-erecting system or directly connected to the latter.

We claim:

1. In a single lens reflex camera having a housing enclosing a viewfinder which includes an image erecting system having an image erecting surface, an image field lens and an eyepiece, wherein the improvement comprises:
   a. a grey wedge having various values of grey, situated in the camera housing adjacent the image erecting surface,
   b. light guiding means positioned on the image erecting surface for directing light from the subject through the grey wedge and into the eyepiece;
   c. exposure factor setting means positioned on the camera housing;
   d. indicating means movable along the grey wedge and
   e. means for coupling the indicating means to the exposure factor setting means to effect movement of the indicating means in response to operation of the exposure factor setting means, whereby the illuminated wedge and indicating means is visible in the viewfinder.

2. In a camera according to claim 1 including a measurement aperture in the camera body through which light from the subject passes to the light guiding means for illuminating the grey wedge.

3. A camera according to claim 2 wherein the image erecting system is a pentaprism having a light entry surface and the light guiding means has first reflecting positioned to reflect light from the measurement aperture through the grey wedge and second reflecting means positioned to direct light from the grey wedge into the light entry surface.

4. In a camera according to claim 1 including means for diverting light from the image erecting system to the light guiding means for illuminating the grey wedge.

5. A camera according to claim 4 wherein the image erecting system is a pentaprism having a light entry surface, and a reflective image erecting surface, the means for diverting light includes a non reflective portion on the image erecting surface through which light from the subject passes to the light guiding means, and the light guiding means has first reflecting means positioned adjacent the non reflective portion to direct light through the grey wedge and second reflecting means positioned to direct light from the grey wedge into the light entry surface.

6. A camera according to claim 1 wherein the exposure factor setting means comprises a plurality of setting rings mounted on the housing for setting individual exposure factors.

7. A camera according to claim 1 wherein the setting means is coupled with the indicating means via a cable.

* * * * *